Dec. 23, 1952     E. F. COOKE, JR     2,622,840
VALVE FOR FLUIDS
Filed May 10, 1949     2 SHEETS—SHEET 1
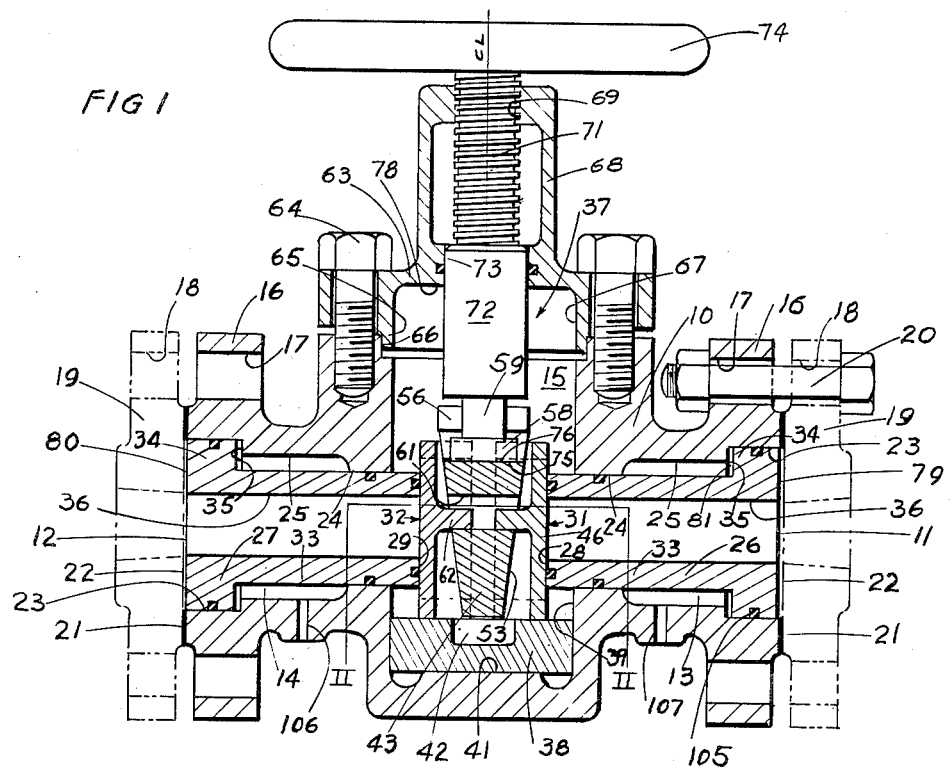
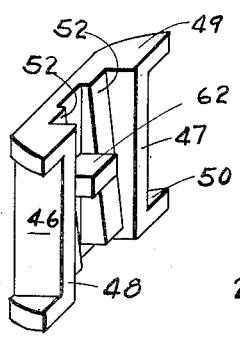
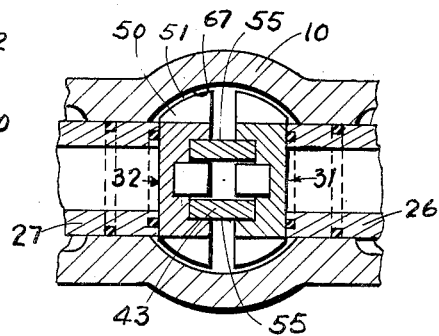
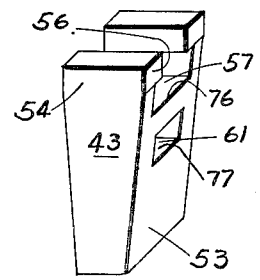
INVENTOR
EDWARD F. COOKE JR.
BY Maurice W. Grady
ATTORNEY Dec. 23, 1952     E. F. COOKE, JR     2,622,840
VALVE FOR FLUIDS
Filed May 10, 1949     2 SHEETS—SHEET 2
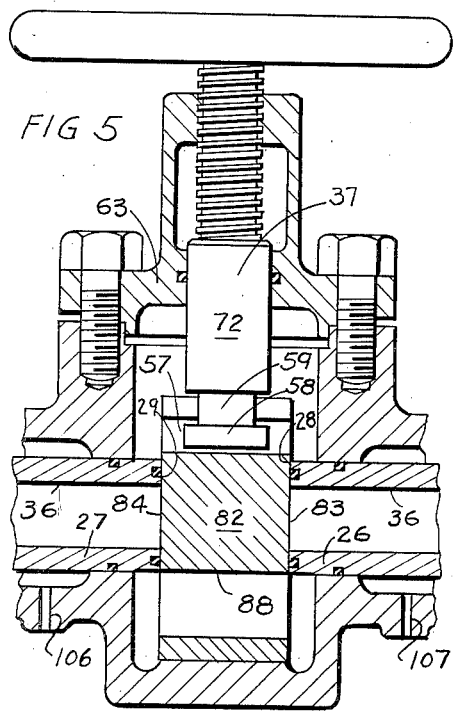
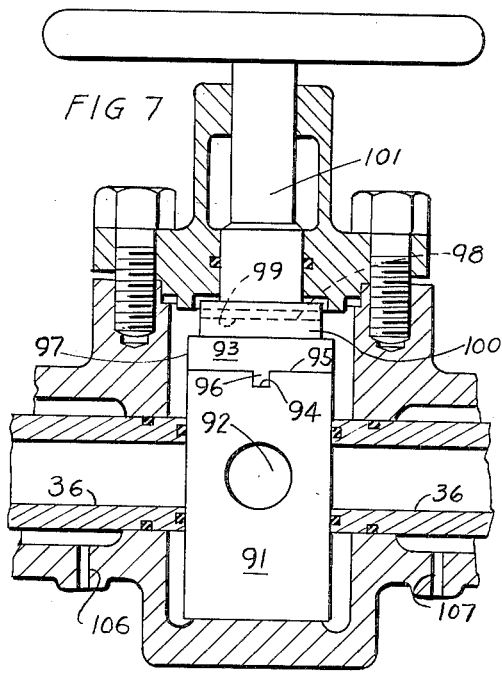
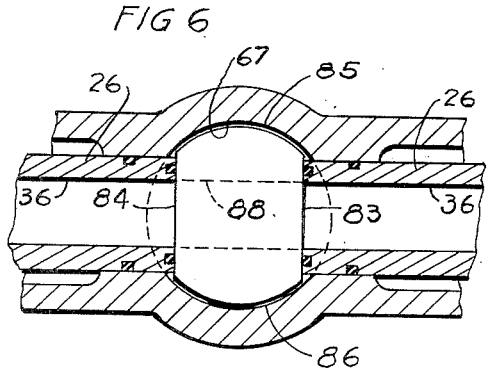
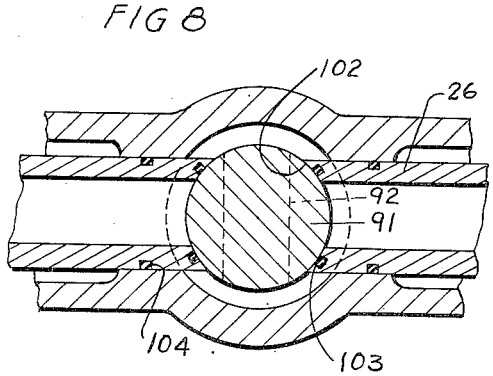
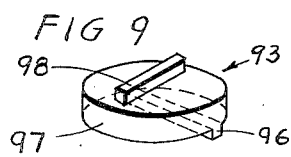
INVENTOR
EDWARD F. COOKE JR.
BY Maurice W. Grady
ATTORNEY Patented Dec. 23, 1952

2,622,840

UNITED STATES PATENT OFFICE 2,622,840

VALVE FOR FLUIDS

Edward F. Cooke, Jr., Beaumont, Tex., assignor to American Locomotive Company, New York, N. Y., a corporation of New York Application May 10, 1949, Serial No. 92,334

2 Claims. (Cl. 251—72)

This invention relates to valves for fluids, and more particularly to seating means for either axially movable or rotatable valves of the gate or plug types.

The principal object of this invention is to provide a valve of either the axially movable or rotatable type in which a movable seat in the form of a tubular piston disposed in the inlet passage and adapted to transmit fluid therethrough is forced against a movable control member and maintained in such position by the pressure of the transmitted fluid when the valve is in either open or closed position.

Another object of this invention is to provide such a valve wherein the seats are formed on tubular piston elements movable in the inlet and outlet passages, the inlet piston being actuated into seated position against the control member by differentially applied pressure of the fluid passing through the valve, and the outlet piston being clamped into seated position between the control member and a stop element by lateral movement of the control member in response to the pressure of the inlet piston, both pistons being adapted to transmit fluid therethrough when the valve is in open position.

Another object is to provide a valve of the axially movable type in which a control unit or gate, comprising twin members and a blade seats against tubular piston elements disposed respectively in the inlet and outlet passages, the piston in the inlet position being forced into seated position against one gate member by differential pressure supplied by the fluid controlled by the valve and the piston in the outlet passage being clamped into seated position between the outer gate member and a stop element by the outward movement of such control unit in response to the fluid pressure.

Still another object is to provide such a valve having movable pistons for seats, the control members and the pistons being so arranged that reversible fluid flow is permitted with the valve operating in the same manner in whichever direction the fluid may flow.

Other and further objects of this invention will appear from the following description, the accompanying drawings, and the appended claims.

In the drawings, Fig. 1 is an elevation of the valve, partly in section, showing a valve having a control member in the form of twin gate members coacting with a blade actuated by the stem, such gate members being seated against pistons disposed in the inlet and outlet passageways;

Fig. 2 is a section taken along the line II—II in Fig. 1;

Fig. 3 is a perspective view of one of the twin gate members;

Fig. 4 is a perspective view of the valve blade;

Fig. 5 is a fragmentary portion of an elevation, partly in section, of a control member in the form of a rising stem single member gate valve as an alternative construction of the valve of the invention;

Fig. 6 is a fragmentary section of a plan of the construction shown in Fig. 5;

Fig. 7 is a fragmentary portion of an elevation, partly in section, of a control member in the form of a rotary plug as a second alternative construction of the valve of the invention;

Fig. 8 is a fragmentary section of a plan of the construction shown in Fig. 7;

Fig. 9 is a perspective view of the adapter shown in Fig. 7.

Referring now to the drawings, the illustrative embodiment of the invention shown in Fig. 1 is in a gate valve of the rising stem type which is adapted for interposition in a fluid conduit such as a pipe line. The valve body 10 is generally cylindrical and is formed symmetrically with reference to its vertical center line, indicated as CL on Fig. 1. When inserted in a conduit, the valve is adapted to function for the regulation of the flow of fluid through the pipe line in either direction.

Body 10 has at its opposite ends inlet and outlet openings 11 and 12 with longitudinal passages 13 and 14 leading therefrom to a central interior chamber 15. The end portions of the body are provided with annular flanges 16 having a plurality of circumferentially arranged holes 17 adapted for registration with corresponding holes 18 in the pipe flanges 19, bolts 20 being provided to clamp the flanges tightly together. Suitable gaskets 21 of predetermined thickness are arranged between the adjacent end faces of the pipe and valve flanges to provide a predetermined clearance 22 therebetween for the purposes hereinafter described. The outer portion of each of the longitudinal passages 15 and 16 is formed as a bore 23 and the inner portion of each of such passages is formed as a bore 24 of less diameter than that of the outside bore. The outer bores are connected with the inner bores by cavities 25 of suitable shape and on the center line of the bores.

Disposed within the longitudinal passages 13 and 14 are tubular pistons 26 and 27, the inner ends of which serve as seats 28 and 29 for twin valve gates, which are generally indicated as 31 and 32, and which will be hereinafter more fully described. The main body 33 of each piston is arranged for sliding movement within inner bore 24. An annularly flanged portion 34 is disposed within outer bore 23 and serves under conditions later to be described to limit the inward movement of the piston by engagement with shoulder 35 formed between outer bore 23 and cavity 25. Each piston is tubular and has a longitudinal cylindrical passage 36 to provide for fluid communication between the pipe lines and the central interior chamber 15, such passages communicating with each other through the central chamber when the valve is in raised or open position. Such pistons are of identical construction and are accordingly interchangeable.

Disposed within the central interior chamber 15 between the opposed pistons and adapted for seating thereagainst is a pair of oppositely arranged valve gate members 31 and 32, such gate members are movable axially by the valve stem, generally indicated as 37, and in cooperation with the stem function as a unit to control the flow of fluid through the valve by opening and closing communication between the aligned passages in the opposed pistons. In their closed position, such gate members rest upon base member 38 arranged in recess 39 and supported on pad 41 of the valve body. Such base member has a well 42 to provide clearance for the downward movement of blade 43 which serves to connect the gate members and stem as hereinafter more fully described. Base member 38 is shown as a separate element, although it would function equally well if formed integrally with the body. Such base is preferably constructed as a separate element so that it may be removed from the body to provide clearance in the event of the use of other gate or plug constructions, such as are shown in Figs. 5 and 7.

The gate members are of identical structure and one is shown in perspective in Fig. 3. The main body 46 of each of the gate members is formed integrally with a pair of parallel side members 47 and 48 which have curved outer portions 49 and 50 of somewhat smaller radius than that of the curvature of the central chamber 15 thereby to allow a clearance for the purposes hereinafter described. The clearance, however, is small enough (see Fig. 2) so that substantial canting of the gate members is prevented and the chamber wall in effect acts as a guide for such members during their axial movement. Formed at the corner between each main body 46 and each of its side members is a downwardly and inwardly tapered rib 52, each pair of ribs cooperating with the tapered side faces 53 of the valve blade 43 to effect a wedging action as hereinafter described.

Valve blade 43 is connected to valve stem 37 and comprises a body portion, generally indicated at 54 (see Fig. 4), which has opposite side faces 55 parallel throughout their entire length and opposite side faces which are parallel for a part of their length, as at 56, and then taper inwardly and downwardly, as at 53. A T-slot 57 is formed in the body portion 54 to provide for connection of the blade with the stem, the latter being provided with a head 58 and connecting neck 59 dimensioned for insertion into the T-slot 57. The T-slot connection provides for the axial movement of the blade and also allows for lateral downstream movement of the blade in reference to the stem upon inward movement of either piston 26 or 27 in response to fluid pressure as hereinafter described. A central aperture 61 extends through the body of the blade for the reception of lifting lugs 62 (Fig. 3) which are formed on the inner walls of the twin gate members 31 and 32.

Bonnet 63 is rigidly mounted upon the body by bolts 64 and has an annular flange 65 for positioning the bonnet in counterbore 66 in the upper portion of the chamber. The bonnet thus fits and seals off the central chamber. The bonnet is provided with a recess 67 which forms in effect an extension of the central chamber 15 and has an upwardly projecting portion 68 through which is formed a threaded aperture 69 for the reception of a corresponding threaded portion 71 of the stem. Stem 37 has a smooth intermediate portion 72 adapted to slide through the guide bore 73 in the bonnet. Operating hand wheel 74 is rigidly secured to the stem to rotate the latter for upward or outward and downward or inward movement. Upon downward movement of the valve stem, the bottom face 75 of the stem head 58 will engage the face bottom 76 of the T-slot in the blade member. The blade member will then be moved downwardly and its tapered faces 53 will engage the tapered ribs 52 of the twin gates 31 and 32 and by a wedging movement will force such gates laterally against the seats 28 and 29 formed by the end faces of the pistons 26 and 27. Upon upward movement of the valve stem, the bottom face 77 (see Fig. 4) of the aperture 61 will engage the lugs 62 of the gates and lift such members to establish communication between the piston passages 36—36. In this connection, it should be noted that the blade body 54 will engage the inner face 78 of the bonnet before the lower ends of the gates clear the pistons and before the threaded portions 71 of the valve stem clears the threaded aperture 69 in the bonnet.

Pistons 26 and 27 are each formed with outer differential pressure surfaces 79 and 80 and inner differential surfaces 28 and 29, the outer surfaces being of considerably larger area than the inner surfaces. When the valve is in closed position, and the fluid in the pipe line is under pressure from right to left as shown in Fig. 1, such fluid will leak into the clearance 22 adjacent the outer differential pressure surface of the piston on the upstream side and into the clearance (not shown) between the inner differential surface and the gate member to exert oppositely directed forces thereon. A much greater force will be exerted upon the outer surface 79 than upon the inner surface 28, and the right piston will accordingly be forced inwardly against gate 31. Since the valve is closed, blade 43 has been wedged into tight position between the twin gate members, and the gates and blade will be moved as a unit by the upstream piston in a downstream direction against the piston on the downstream side. As the two pistons and the blade-gate unit are moved downstream the outer surface 80 of the downstream piston will engage the pipe flange 19 which will serve as a stop before the annular flange 34 engages the shoulder 35. In other words, the clearance 22 must be smaller than the clearance 81 between flange 34 and shoulder 35. This will result in the maintenance of both pistons tightly against the gate, the one to the left being clamped between the pipe flange and the gate, and the one to the right being forced against the gate by fluid pressure. The dimensions of the clearances 22, 51, and 81 are significant. It should be recalled that some clearance is allowed between the curved portions 49 and 50 and the inner wall 67 of the central interior chamber 15 which allows for the downstream movement of the gate-blade unit to the extent required until the downstream piston engages the pipe flange 19. If the gate should engage the wall before the downstream piston engages the valve flange, then the downstream piston would not seat tightly against the gate.

Obviously, if the flow of fluid in the pipe line should be in the direction opposite to that heretofore described, the piston to the left will be moved against the gate and the gate-blade unit in turn moved against the piston to the right and the corresponding elements will be affected in the reverse direction. The dimensions of the various elements described and of the clearances are such that the pistons, gate members, and blade will cooperate to function in the same manner in whichever direction the flow of fluid may be.

When the valve has been elevated to open position, the flow of fluid through the valve is prevented from forcing the piston inwardly beyond the limits permitted by the engagement of the flange 34 with the shoulder 35.

In Fig. 5, the invention is shown embodied in a gate valve of the rising stem type, and, so far as the structures are the same, the parts of this embodiment and the corresponding parts of the embodiment shown in Fig. 1 have the same reference numbers. The fluid control member is shown in the form or gate 82 which has parallel flat sides 83 and 84 and arcuate side portions 85 and 86 (Fig. 6) which conform to the curvature of the inner wall 67 of the central chamber 15, clearance being allowed as in the embodiment shown in Fig. 1. Extending through the gate from one flat side to the other is a cylindrical aperture 88 which may be brought into communication with the tubular passages 36 in the opposed pistons 26 and 27 by the axial movement of the stem, thereby to establish communication from one pipe to the other. Stem 37 has a threaded portion 11 and a smooth central portion 72 for guided movement through the bonnet 63 in the same manner as shown in Fig. 1. Stem 37 has a head 58 and a neck 59 for engagement with the T-slot 57 formed on the upper end portion of the gate. The gate can thus be lifted or moved to open position or moved downwardly to closed position by running the threaded stem outwardly or inwardly as the case may be. Lateral movement of the gate with reference to the stem under the pressure of the upstream piston is provided for by the T-slot.

Tubular pistons 26 and 27, only fragmentary portions of which are shown in Fig. 6, are disposed within longitudinal passages 13 and 14, and their inner ends serve as seats 28 and 29 for engagement with the flat sides 83 and 84 of the gate. The inner differential surfaces 28 and 29 and the outer differential surfaces (see Fig. 1) function as in the first embodiment, and accordingly, the pressure of the fluid transmitted through the valve will act upon the pistons in the manner described in the case of the first embodiment. Clearances are provided between the outer ends of the pistons and the pipe flanges, between the piston flanges and the body shoulders, and between the gate and the chamber wall as in the case of the first embodiment.

In Fig. 7, the invention is shown embodied in a rotary plug valve of the non-rising stem type, and, so far as the structures are the same, the parts of the embodiment have the same reference numbers as the corresponding parts of the embodiment shown in Fig. 1. The fluid control member in this embodiment is shown as a plug 91. Plug 91 is cylindrical with a transverse cylindrical aperture running therethrough and serves upon rotation as a fluid control member to open and close communication between the tubular passages in the pistons 26 and 27 and thereby between the pipe line sections. A transverse slot 94 is formed in the top face 95 of the plug parallel to the center line of the aperture 92 to receive a corresponding key 96 formed upon the bottom face of the adapter 93. Such adapter has a cylindrical body 97 having an outside diameter equal to that of the cylindrical plug, and forms, in effect, an upward extension of the plug when disposed in operated position. Atop the adapter is formed integrally therewith a second key 98 arranged normally to the first key 96. Key 98 fits into the transverse slot 99 formed in the head 100 of the stem 101. The adapter thus serves, first as a connecting means between the stem and the plug so that rotation of the former may be transmitted to the latter, and second to allow for relative lateral movement between the plug and stem in response to the inward movement of the piston resulting from the fluid pressure, as described in connection with the previous embodiments. The tubular pistons will function in this instance as in the previously described embodiments, responding to the pressure of the fluid to seat against the plug and to move the plug to clamp the downstream piston into tightly seated position. Key 96, of course, will be rotated by the hand wheel 74 into alignment with the axes of the pistons and hence with the fluid flow to permit lateral movement of the plug in reference to the stem.

Stem 101 in this embodiment is not threaded since it is not intended that it shall move axially in relation to the bonnet. The inner ends of the pistons in this embodiment are curved, as at 102, to conform to the periphery of the cylindrical plug. Otherwise, the pistons herein serve in the same manner as in the embodiments previously described.

Ring seals 103, 104, and 105 are disposed in annular recesses in the pistons for proper operation of the valve, and since their function is obvious, no description need be given. Vent holes 106 and 107, which are shown as drilled passages, are provided for purposes of the original and any replacement assembly, to prevent the capture of air in cavities 13 and 14 which would build up an air pocket to limit movement of the pistons into tightly seated positions when the valve is in operation.

While there has been hereinbefore described an approved embodiment of this invention, it will be understood that many and various changes and modifications in form, arrangement of parts and details of construction thereof may be made without departing from the spirit of the invention, and that all such changes and modifications as fall within the scope of the appended claims are contemplated as a part of this invention.

The invention claimed and desired to be secured by Letters Patent is:

1. A valve comprising a body having a central chamber; axially aligned fluid inlet and outlet passages in communication with the central chamber; a valve stem having a head; a valve gate disposed in the central chamber with clearance to allow for its movement along the axial line of the passages, such gate including a pair of opposed members each having a tapered element therein and a blade having a slot to receive the stem head thereby to allow the aforesaid axial movement of the valve and also to permit the stem to move the valve to open and closed positions, said blade having tapered sides adapted to coact with the tapered elements to effect a wedging action whereby the members are forced apart upon predetermined movement of the stem; a tubular piston adapted to move axially in the inlet passage and to transmit fluid therethrough and having differential pressure areas whereby such fluid will force such piston into seated position against one of the pair of gate members, a tubular piston adapted to move axially in the outlet passage, to transmit fluid therethrough, and having a face adapted to serve as a seat for the other of the pair of gate members, said gate being adapted to move downstream as a unit in response to the pressure of the inlet piston; and stop means associated with the valve body to limit downstream movement of the outlet piston thereby to clamp such piston into seated position against the gate member.

2. A valve comprising a body having a central chamber with opposed arcuate walls, axially aligned fluid inlet and outlet passages in communication therewith, a valve stem having a head, a valve gate including a blade with a slot to receive said head thereby to allow movement of the gate along the axis of the passages and also to permit the stem to move the valve gate to open and closed positions, a tubular piston adapted for limited axial movement in the inlet passage and to transmit fluid therethrough and having differential pressure areas whereby pressure from such fluid will force the piston against the gate thereby to move the gate downstream, a tubular piston adapted for limited axial movement in the outlet passage and to transmit fluid therethrough and having a face adapted to seat against the gate so that the piston will be moved downstream in response to movement of the gate in that direction, said gate including a pair of opposed members each of which has an arcuate portion conforming to the arcuate chamber walls to be guided thereby when the gate is opened or closed, such arcuate portions being spaced from the walls to permit axial movement of the gate, said members also having tapered portions adapted to cooperate with the tapered sides of the blade whereby they will be forced apart by wedging action against the pistons upon valve closing movement of the stem, and stop means associated with the valve body to limit downstream movement of the outlet piston thereby to clamp such piston into seated position against the gate as the latter may be moved downstream in response to fluid pressure upon the inlet piston.

EDWARD F. COOKE, Jr.

REFERENCES CITED

The following references are of record in the file of this patent:

UNITED STATES PATENTS

| Number | Name | Date |
| --- | --- | --- |
| 783,953 | Henry | Feb. 28, 1905 |
| 834,878 | Anderson | Nov. 6, 1906 |
| 910,163 | Benninghoff | Jan. 19, 1909 |
| 1,642,973 | Shipley | Sept. 20, 1927 |
| 2,030,458 | McKellar | Feb. 11, 1936 |
| 2,201,895 | Glen | May 21, 1940 |